United States Patent
Xu et al.

(10) Patent No.: US 10,412,042 B2
(45) Date of Patent: Sep. 10, 2019

(54) TOPOLOGY BASED INTERNET PROTOCOL (IP) ADDRESSING

(71) Applicant: Rockwell Automation Technologies, Inc., Mayfield, OH (US)

(72) Inventors: Dayin Xu, Shanghai (CN); Brian Batke, Novelty, OH (US); Yi Yu, Shanghai (CN); David Brandt, New Berlin, WI (US); Clifford J. Whitehead, Cleveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 162 days.

(21) Appl. No.: 15/271,591

(22) Filed: Sep. 21, 2016

(65) Prior Publication Data

US 2018/0083917 A1    Mar. 22, 2018

(51) Int. Cl.
*H04L 29/12*     (2006.01)
*H04L 12/749*    (2013.01)
(Continued)

(52) U.S. Cl.
CPC ...... *H04L 61/2015* (2013.01); *H04L 61/2038* (2013.01); *H04L 61/6022* (2013.01);
(Continued)

(58) Field of Classification Search
CPC ............. H04L 61/2007; H04L 61/2015; H04L 29/12216; H04L 45/741
See application file for complete search history.

(56) References Cited

U.S. PATENT DOCUMENTS 6,801,949 B1 *  10/2004  Bruck .............. H04L 29/12009
                                                   709/232
6,895,007 B1 *   5/2005  Teraoka ........... H04L 29/12216
                                                   370/352
(Continued)

FOREIGN PATENT DOCUMENTS

DE       19750470 A1     6/1999
DE       10038783 A1     3/2001

OTHER PUBLICATIONS

Extended European Search Report dated Feb. 13, 2018; European Application No. 17186386.3—(8) pages.

*Primary Examiner* — Barbara B Anyan
(74) *Attorney, Agent, or Firm* — Boyle Fredrickson, S.C.

(57) ABSTRACT

IP addresses may be allocated to devices in an industrial control system by applying starting address information in combination with each device's relative position in a local network. The starting address information, which may include an IP subnet address, gateway address, subnet mask, subnet size, and/or local network group identifier, may be provided to a first positioned, or "initiator," device in a local network. The initiator device may determine its IP address by applying the starting address information and knowledge of being the first positioned device. The initiator device may send the position information and at least a portion of the starting address information to a next device, which may determine its relative position based on the received position information, and which may apply its relative position with the portion of the starting address information to determine its IP address. This process may continue sequentially for each device.

20 Claims, 8 Drawing Sheets

(51) Int. Cl.
  *H04L 12/751*   (2013.01)
  *H04W 84/18*   (2009.01)
(52) U.S. Cl.
  CPC .. *H04L 29/12009* (2013.01); *H04L 29/12018* (2013.01); *H04L 45/02* (2013.01); *H04L 45/741* (2013.01); *H04L 61/2092* (2013.01); *H04W 84/18* (2013.01)

(56) References Cited

U.S. PATENT DOCUMENTS

| | | |
|---|---|---|
| 7,483,396 B2 | 1/2009 | Steindl |
| 8,433,827 B2 | 4/2013 | Biehler |
| 2007/0195729 A1* | 8/2007 | Li ........................ H04L 29/1232 370/328 |
| 2008/0288654 A1* | 11/2008 | Matuszewski .... H04L 29/12018 709/238 |
| 2009/0034470 A1* | 2/2009 | Nagarajan ........... H04L 12/1886 370/331 |
| 2009/0125637 A1* | 5/2009 | Matuszewski ........ H04L 63/166 709/238 |
| 2010/0185784 A1 | 7/2010 | De Nie et al. |
| 2010/0274945 A1 | 10/2010 | Westrick, Jr. et al. |
| 2011/0173305 A1* | 7/2011 | Matuszewski .......... H04L 45/02 709/221 |
| 2016/0234162 A1* | 8/2016 | Sabet ....................... H04L 43/08 |
| 2016/0315859 A1* | 10/2016 | Buesker ................ H04L 45/741 |

\* cited by examiner

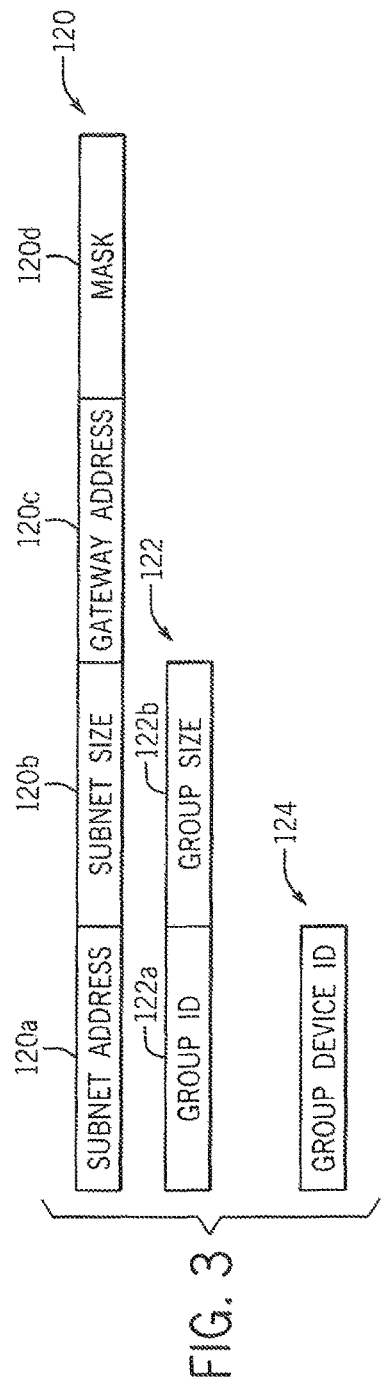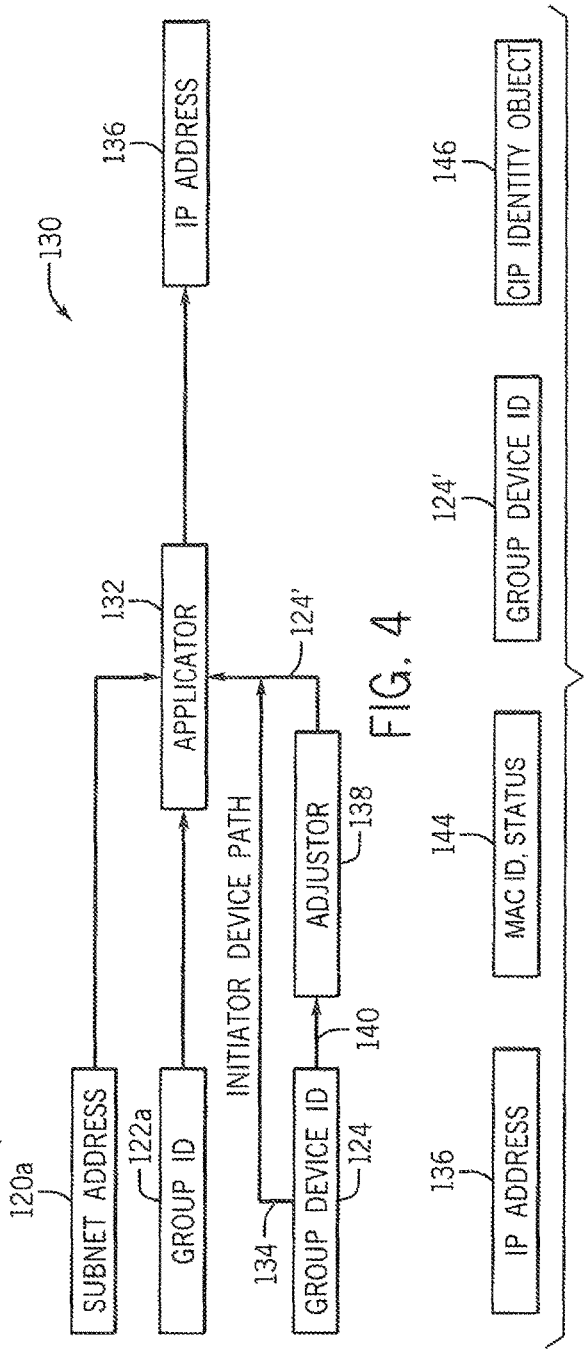

| PHYSICAL POSITION | DEVICE ID INFORMATION (E.G. PRODUCT KEY) | IP ADDRESSING MODE | IP ADDRESS | NAME |
|---|---|---|---|---|
| 1 | PRODUCT KEY 1 | WAITFORAUTOSETTING | 0.0.0.0 | EN2T |
| 2 | PRODUCT KEY 2 | WAITFORAUTOSETTING | 0.0.0.0 | POINTIO |
| 3 | PRODUCT KEY 3 | WAITFORAUTOSETTING | 0.0.0.0 | POWERFLEX |
| 4 | PRODUCT KEY 4 | WAITFORAUTOSETTING | 0.0.0.0 | E300 |
| ... | ... | ... | ... | ... |
| N | PRODUCT KEY N | WAITFORAUTOSETTING | 0.0.0.0 | COLOR SENSOR |

FIG. 8

| PHYSICAL POSITION | IP ADDRESS | DEVICE ID INFORMATION (E.G. PRODUCT KEY) | OTHERS (E.G. MAC ID, STATUS) |
|---|---|---|---|
| 1 | IP1 | PRODUCT KEY 1 | |
| 2 | IP2 | PRODUCT KEY 2 | |
| 3 | IP3 | PRODUCT KEY 3 | |
| 4 | IP4 | PRODUCT KEY 4 | |
| ... | ... | ... | |
| N | IPN | PRODUCT KEY N | |

FIG. 9

TOPOLOGY BASED INTERNET PROTOCOL (IP) ADDRESSING

FIELD OF THE INVENTION

The present invention relates to the field of industrial control systems, and more particularly, to a system and method for assigning Internet Protocol (IP) addresses to industrial control devices in a local network group.

BACKGROUND

Industrial controllers are specialized computer systems used for the control of industrial processes or machinery, for example, in a factory environment. Generally, an industrial controller executes a stored control program that reads inputs from a variety of sensors associated with the controlled process or machine and, sensing the conditions of the process or machine, and based on those inputs and a stored control program, calculates a set of outputs used to control actuators controlling the process or machine. Special control languages, such as "relay ladder logic" are normally used to facilitate programming of the device. Under the direction of the stored program, a processor of the industrial controller periodically examines the state of input devices and updates the state of output devices. In order to ensure predictable control of a machine or process, the control program must be highly reliable and deterministic, that is, executing at well-defined time periods.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Generally, industrial controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, EtherNet/IP, DeviceNet and ControlNet) differ from standard communication networks by guaranteeing maximum communication delays by pre-scheduling the communication capacity of the network, and/or providing seamless redundant communication capabilities for high-availability.

As part of their enhanced modularity, industrial controllers may employ I/O modules or devices dedicated to a particular type of electrical signal and function, for example, detecting input AC or DC signals or controlling output AC or DC signals. Each of these I/O modules or devices may have a connector system allowing them to be installed in different combinations in a housing or rack along with other selected I/O modules or devices to match the demands of the particular application. Multiple or individual I/O modules or devices may be located at convenient control points near the controlled process or machine to communicate with a central industrial controller via the control network.

Control networks may employ "connected messaging" in which the bandwidth of the network and buffer space is pre-allocated to dedicated "connections" to detect lost or unpredictably delayed data control message transfers or to guarantee client/server transaction integrity as in common Ethernet usage. An example of connected messaging is embodied within Common Industrial Protocol (CIP), which is a media independent industrial protocol for industrial automation applications supported by the Open DeviceNet Vendors Association (ODVA). CIP is described in "The Common Industrial Protocol (CIP) and the Family of CIP Networks," Copyright 2006, Open DeviceNet Vendor Association, Inc., which document is incorporated herein by reference in its entirety.

CIP encompasses a comprehensive suite of messages and services for the collection of manufacturing automation applications, including control, safety, synchronization, motion, configuration and other information. Application extensions to CIP include: CIP Safety, providing a communication between nodes such as safety I/O blocks, safety interlock switches, safety light curtains and safety PLC's in safety applications up to Safety Integrity Level (SIL) 3 according to IEC 61508 standards; CIP Motion, allowing integration of field devices and motion drives on the same network thereby eliminating the need for a separate motion optimized network; and CIP Sync, a time synchronization extension to CIP based on the recent IEEE-1588 standard—Precision Clock Synchronization Protocol for Networked Measurement and Control Systems—providing increased control coordination for sequencing demanding events recording, distributed motion control and other distributed applications. CIP maximizes compatibility among devices in an industrial system, and typical control networks implementing CIP include EtherNet/IP, DeviceNet, ControlNet and similar networks whose specifications are published and whose protocols are used broadly by a number of manufacturers and suppliers.

In industrial control systems, it is often desirable to communicate with different devices in the system to accomplish various purposes, such as monitoring device statuses, monitoring sensors, controlling actuators, and so forth. Such communications may be achieved using an Internet Protocol (IP) based addressing network (such as an EtherNet/IP network) in which unique IP addresses are assigned to different devices. However, assigning IP addresses to "constrained" devices can be difficult. Constrained devices are devices typically having limited power, computational capability, memory, communication rates or are otherwise resource constrained, and in some instances, may be devices that are battery powered. Examples of constrained devices may include electronic overload relays, pushbuttons, contactors, proximity sensors and other I/O elements.

In the past, constrained devices might not have received IP addresses at all. The constrained nature of such devices often prevents the ability to support Dynamic Host Configuration Protocol (DHCP) or Bootstrap Protocol software, or to support hardware switches for static IP address assignment, and as a result, inhibits IP address assignment via existing addressing methods altogether. Moreover, implementation of traditional DHCP software, even if feasible, may still be undesirable in industrial control systems as DHCP assignments generally inhibit maintaining fixed IP addresses for specific devices, which is often an important function in industrial control systems.

Further complicating the establishment of communication in industrial control systems, devices may also be configured in parts of the system according to different network topologies, such as linear, ring and/or star topologies. Moreover, such devices, including constrained devices, are usually present in large amounts. As a result, assigning IP addresses to each individual device, such as by using DHCP software or hardware switches where feasible, may be inefficient and/or ineffective due to, for example, the need for increased time to set up the network, difficulty in ensuring IP address uniqueness, and the like. In addition, the possibility of applying changes to the system, including updating hardware or software, replacing devices, and so forth, also complicates maintaining a fault tolerant addressing scheme.

It is therefore desirable to provide an improved industrial control system capable of communicating with more devices in the system (including constrained devices) while minimizing the difficulty of such configurations.

SUMMARY OF THE INVENTION

The present inventors have recognized that IP addresses may be allocated to devices in an industrial control system by applying starting address information in combination with each device's relative position in a local network. The starting address information, which may include an IP subnet address, gateway address, subnet mask, subnet size, and/or local network group identifier, may be provided to a first positioned, or "initiator." device in a local network. The initiator device may determine its IP address by applying the starting address information and knowledge of being the first positioned device. The initiator device may send the position information and at least a portion of the starting address information to a next device, which may determine its relative position based on the received position information, and which may apply its relative position with the portion of the starting address information to determine its IP address. This process may continue sequentially for each device in the local network until each device has an IP address. As a result, IP addresses may be assigned to a wider variety of devices, including constrained devices. Also, network device changes may be more quickly resolved.

For groups implementing linear or ring topologies, a first device in the group may function as an "initiator" device. The initiator device may be provided with global network information. The initiator device may then execute a position-based sequential IP addressing process. The Network ID, Group ID and updateable GDID may be provided to every device via addressing command messages. Each device may then generate its GDID based on its position in the network. With a determined GDID, each device may then also determine an IP address according to the Network ID, the Group ID and its GDID taken together. The "topology information" (which may include a list of devices with corresponding IP addresses, MAC addresses, device ID's and/or position ID's and/or a total number of devices) and/or "status information" (which may communicate a topology change and/or device fault in the group, if any) may be returned as an addressing result to each of the devices via an "addressing complete message." Aspects of the invention could be implemented, for example, according to Internet Protocol version 4 ("IPv4") or Internet Protocol version 6 ("IPv6").

Accordingly, in an industrial control network which may have a router at a first level, connected to multiple switches at a second level which, in turn, connect to multiple devices at a third level, the network may be divided according to "sub-networks" and "groups." Sub-networks may be collections of devices which connect through a common switch in the network. Groups may be a collection of devices which locally connect to one another in a "sub-network." Each group may implement its own topology, such as: (1) a linear topology in which devices physically connect one after another in a daisy chain; (2) a ring topology in which devices physically connect one after another to form a closed loop; or (3) a star topology in which each device physically connects point to point with a common connection point. Moreover, the topologies of groups may differ from one another in a single network. IP address assignment according to the present invention may be useful in instances where a new network is being commissioned, a portion of the network is being updated or upgraded, and/or one or more devices of the network are being replaced.

With the aforementioned industrial control system architecture, an IP addressing methodology may be provided in which IP addresses may be generated based on the physical topology of groups. The IP addresses may consists of (1) a "Network ID"/"network information" (which may be assigned by the router for the connected subnet, and which may include a gateway address, subnet mask, subnet ID or prefix (e.g., 192.168.1), and subnet size (e.g., 256)); (2) a "Group ID"/"group information" (which may be assigned by the switch for the group, and which may include a group ID and/or group size); and (3) a "Group Device ID" (GDID) (which may be based on a device's position in the group relative to a first device in the group functioning as an "initiator" device for the linear or ring topology, or which port of a common connection point the device may be connected to for the star topology).

For groups implementing linear or ring topologies, a first device in the group may function as an "initiator" device. The initiator device may be provided with start address information, including the Network ID, the Group ID and a starting GDID. The start address information could come from a switch, a remote DHCP server, or a user tool. For example, a user could set up a group size (number of devices in the network group) and a device's IP parameters (IP Address, Net Mask, Gateway address, and so forth) with a user tool to generate the start address information. The initiator device may then execute a position-based sequential IP addressing process which may be commanded by a user via a hardware or software interface. The IP addressing process may allow, among other things: (1) addressing all devices in a network for a newly commissioned system; (2) addressing newly added devices in a network, such as for a system upgrade; and/or (3) addressing replaced devices in a network, such as for a faulted device replacement. The addressing process may be executed, for example, via layer-2 addressing messages (the data link layer of the well-known seven-layer Open Systems Interconnection (OSI) model for computer networking). The Network ID, Group ID and updateable GDID may be provided to every device via addressing command messages. Each device may then generate its GDID based on its position in the network. With a determined GDID, each device may then also determine an IP address according to the Network ID, the Group ID and its GDID taken together. The "topology information" (which may include a list of devices with corresponding IP addresses. MAC addresses, device ID's and/or position ID's and/or a total number of devices) and/or "status information" (which may communicate a topology change and/or device fault in the group, if any) may be returned as an addressing result to each of the devices via an "addressing complete message." Other devices in the system, such as workstations, controllers, and the like, may retrieve such information for different purposes, such as to display the topology, set IP addresses in an industrial controller's configuration, and so forth.

In one aspect (concept 1), the initiator device may access or receive a Network ID, Group ID and starting GDID. The initiator device could be, for example, an industrial controller accessing a default Network ID, Group ID and/or starting GDID stored locally in the device. The initiator device could also be, for example, a common managed industrial network switch accessing multiple sets of Network ID, Group ID and/or starting GDID stored locally for different groups. Applying the aforementioned sequential IP address assignment process, the initiator device may determine a starting IP address from the Network ID, Group ID and starting GDID. The initiator device may then forward the Network ID, Group ID and GDID to a next device in the group in an "addressing command message." The next device, in turn, may receive the "addressing command message" and determine its GDID based on its position in the network relative to the initiator. The next device may then also determine its IP address based on the Network ID, Group ID and its GDID taken together. The next device may then forward the Network ID, Group ID and its GDID (updated) to its next device in the group, continuing the "addressing command message." This sequence continues through each device until all of the devices in the group have determined a GDID and IP address. Lastly, the "topology information" and/or "status information" may be returned through the devices in the group to complete the IP address assignment via the "addressing complete message."

In another aspect (concept 2), an upstream element may access or receive a Network ID, Group ID and/or starting GDID. The upstream element could be, for example, a common managed network switch for the sub-network accessing a default Network ID, Group ID and/or starting GDID stored locally in the switch. The upstream element, for example, a common switch for the sub-network, may store multiple sets of Network ID, Group ID and/or starting GDID for different initiators. The upstream element, in turn, may provide the Network ID, Group ID and/or starting GDID to the initiator device. The initiator device, in turn, may apply the aforementioned sequential IP address assignment process, including sending the "addressing command message" and receiving the "addressing complete message," as described above with respect to Concept 1.

In another aspect (concept 3), an upstream element may access or receive a Network ID, Group ID and/or starting GDID. The upstream element could be, for example, a common managed network switch for the sub-network accessing a default Network ID, Group ID and/or starting GDID stored locally in the switch. The upstream element, for example, a common switch for the sub-network, may store multiple sets of Network ID, Group ID and/or starting GDID for different initiators. In addition, the upstream element may implement a DHCP server for allocating IP addresses based on an optional Network ID, optional Group ID and/or GDID taken together for devices in the group. The upstream element may provide the Network ID, Group ID and/or starting GDID to the initiator device. The initiator device, in turn, may apply the aforementioned sequential IP address assignment process, including sending the "addressing command message" and receiving the "addressing complete message," as described above with respect to Concept 1. However, instead of each next device determining its IP address, each next device may communicate its determined GDID to the upstream element implementing the DHCP server, and the upstream element implementing the DHCP server may determine the IP address for the device and provide the device with an IP address and other "network information".

In another aspect (concept 4), an upstream element may access or receive a Network ID, Group ID and/or starting GDID. The upstream element could be, for example, a common managed network switch for the sub-network accessing a default Network ID, Group ID and/or starting GDID stored locally in the switch. The upstream element, for example, a common switch for the sub-network, may store multiple sets of Network ID, Group ID and/or starting GDID for different initiators. In addition, a separate DHCP server may also be provided in the system for allocating IP addresses based on Network ID, Group ID and GDID taken together for devices in the group. The upstream element may provide an optional Network ID, Group ID and/or starting GDID to the initiator device. The initiator device, in turn, may apply the aforementioned sequential IP address assignment process, including sending the "addressing command message" and receiving the "addressing complete message," as described above with respect to Concept 1. However, instead of each next device determining its IP address, each next device communicates its determined GDID and Group ID to the DHCP server, and the DHCP server may determine the IP address for the device and provide the device with an IP address and other "network information."

Specifically then, one aspect of the present invention provides a method for assigning Internet Protocol (IP) addresses to industrial control devices in a local network group connected to a switch, the local network group being part of an industrial control network connected to a router. The method may include: (a) providing starting address information to a first device in the local network group, the starting address information including: (i) an IP subnet address for the router; and (ii) a group device identifier for distinguishing the first device from other devices in the local network group, the group device identifier initially indicating that the first device is positioned first in the local network group; (b) sending an addressing command message from the first device to a second device in the local network group, the addressing command message including the IP subnet address and the group device identifier for the first device; (c) determining a position for the second device in the local network group and updating the group device identifier in the addressing command message to produce an updated group device identifier for the second device; and (d) determining an IP address for the second device by applying the IP subnet address and the updated group device identifier to produce the IP address.

Another aspect may provide an industrial control system including: a router; a switch connected to the router; and first and second devices connected in a local network group, the local network group being connected to the switch. The first device may be operable to receive starting address information including: (i) an IP subnet address for the router; and (ii) a group device identifier for distinguishing the first device from other devices in the local network group, the group device identifier initially indicating that the first device is positioned first in the local network group. The first device may be further operable to execute a program stored in a non-transient medium operable to send an addressing command message to the second device in the local network group, the addressing command message including the IP subnet address and the group device identifier for the first device. The second device may be operable to execute a program stored in a non-transient medium operable to: (a) determine a position for the second device in the local network group and update the group device identifier in the addressing command message to produce an updated group device identifier for the second device; and (b) determine an IP address for the second device by applying the IP subnet address and the updated group device identifier to produce the IP address.

Another aspect may provide an industrial control system including: a router; a switch connected to the router; and first and second devices connected in a local network group, the local network group being connected to the switch, wherein the first device is operable to receive starting address information including: (i) an IP subnet address for the router; and (ii) a group device identifier for distinguishing the first device from other devices in the local network group, the group device identifier initially indicating that the first device is positioned first in the local network group. The first device may be further operable to execute a program stored in a non-transient medium operable to send an addressing command message to the second device in the local network group, the addressing command message including the IP subnet address and the group device identifier for the first device. The second device may be operable to execute a program stored in a non-transient medium operable to: (a) determine a position for the second device in the local network group and update the group device identifier in the addressing command message to produce an updated group device identifier for the second device; (b) send the updated group device identifier to an address assigning device for applying the IP subnet address and the updated group device identifier to produce an IP address; and (c) receive the IP address from the address assigning device.

In addition, a system may be provided in which a position for each device (relative to other devices) in a topology, and a corresponding device ID for each device, may be predetermined. Then, the predetermined position and corresponding device ID for each device may be compared to actual devices in a topology having preprogrammed device ID's and pre-assigned IP addresses. If the comparison produces a match, the pre-assigned IP addresses in the actual devices may be utilized. However, if the comparison does not produce a match, the condition may be reported for further action.

IP address assignment according to the present invention may be useful in instances where a new network is being communissioned, a portion of the network is being updated or upgraded, and/or one or more devices of the network are being replaced. IP address assignment according to the present invention may advantageously avoid the need for reconfiguring IP address settings in industrial controller for each system when identical machines are installed in adjacent working cells.

In one aspect, an industrial control program and device configuration for linear or ring topology portions of a system may be developed by a user offline with a configuration software, such as the Studio 5000 environment available from Rockwell Automation. A linear topology may be a topology in which devices physically connect one after another in a daisy chain. A ring topology may be a topology in which devices physically connect one after another to form a closed loop. The control program may allow operation of devices to control an industrial process using sensors and actuators as known in the art. The device configuration may reflect a predetermined position for each device (relative to other devices in the topology) and a corresponding predetermined device ID for each device. In one aspect, the predetermined device ID may preferably include one or more Common Industrial Protocol (CIP) product keys (such as a vendor ID, device ID, product code, major revision, minor revision, and the like), which may avoid the need for reconfiguring IP address settings in industrial controller for each system when identical machines are installed in adjacent working cells, though in other aspects a MAC address could be used. A corresponding IP address for each device may be left open pending an assignment (e.g., set to "Wait-ForAutoSetting"). The control program and device configuration may then be installed on an industrial controller connected to devices implementing a topology, and the industrial controller may hold the control program in an "idle" mode pending resolution of IP addresses for such devices.

The industrial controller may then initiate an automatic device IP addressing process in which the industrial controller individually discovers and/or determines information from each device, such as: (1) each device's position in the topology (relative to other devices in the topology); (2) each device's device ID (such as a CIP product key or MAC address); and (3) each device's IP address assigned during the automatic device IP addressing process. This may be accomplished, for example, by the industrial controller communicating an "auto-IP command message" through each device in the linear chain and receiving an "auto-IP complete message." The industrial controller then compares the position and device ID discovered for each device with the predetermined position and device ID in the device configuration installed on the industrial controller. This comparison attempts to correlate identical positions of devices with identical corresponding device ID's between what has been predetermined in the device configuration and what has been discovered in the topology. If the predetermined topology information in the device configuration matches the discovered topology information, the industrial controller writes the device IP addresses to the device configuration, confirms the devices in the topology are available, and places the control program in a "run" mode for normal operations using the IP addresses to communicate with the devices in the topology. However, if the predetermined topology information in the device configuration does not match the discovered topology information, the industrial controller reports the condition to a user for further action.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

FIG. 3 is an exemplar data field which may be communicated in an addressing command message in the system of FIG. 1;

FIG. 4 is a block diagram of an address assignment system which may be used to determine IP addresses in the system of FIG. 1;

FIG. 5 is an exemplar data field which may be communicated in an addressing complete message in the system of FIG. 1;

FIG. 8 is an exemplar device configuration providing parameters in tabular form in accordance with an embodiment of the invention; and FIG. 9 is an exemplar device collection also providing parameters in tabular form in accordance with an embodiment of the invention.

DETAILED DESCRIPTION

Figure 1:
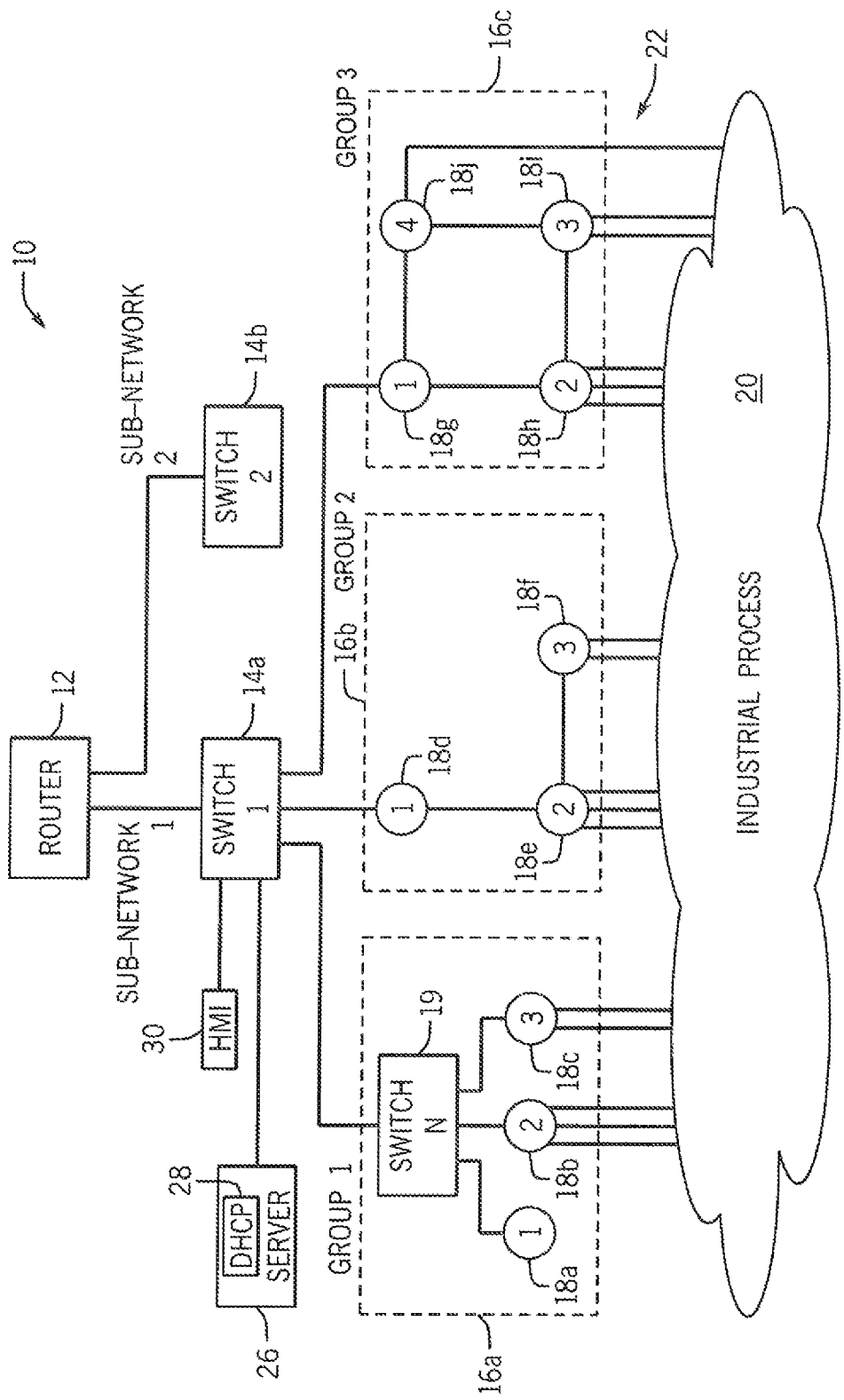
FIG. 1 is a block diagram of an exemplar industrial control system which may implement a method for assigning Internet Protocol (IP) addresses to devices in the system in accordance with an embodiment of the invention.

Referring now to FIG. 1, a block diagram of an exemplar industrial control system 10 which may implement a method for assigning Internet Protocol (IP) addresses to devices in the system is provided in accordance with an embodiment of the invention. The system 10 may include a router 12 which may connect to Wide Area Network (WAN) for connecting to other devices, such as another system similar to the system 10 and/or the Internet. The router 12 may be a networking device configured to forward data packets between industrial control networks.

The router 12 may connect to one or more switches 14 (illustrated in FIG. 1 as switches 14a and 14b, corresponding to "Switch 1" and "Switch 2," respectively, shown by way of example) in the system 10. Accordingly, each switch 14 may establish a IP sub-network in the system 10, such as "sub-network 1" associated with Switch 1, "sub network 2" associated with Switch 2, and so forth. Each switch 14, in turn, may connect to one or more local network groups 16 (illustrated in FIG. 1 as local network groups 16a, 16b and 16c, corresponding to "Group 1," "Group 2" and "Group 3," respectively, shown by way of example). Each local network group 16 may include multiple industrial control devices 18 (illustrated in FIG. 1 as devices 18a though 18j), with the devices being operable to control an industrial process or machine 20. Devices 18 may include industrial controllers, drives, I/O modules and the like, as well as constrained devices (which may have limited power, computational capability, memory, communication rates or be otherwise resource constrained), such as electronic overload relays, pushbuttons, contactors, proximity sensors and other I/O elements. Accordingly, devices 18 may include various connections 22 to sensors for sensing conditions of the process or machine 20 and/or actuators for controlling the industrial process or machine 20 as known in the art.

The local network groups 16, within a sub-network, may each implement a variety of network topologies, such as star, linear and/or ring topologies. As illustrated in FIG. 1 by way of example, the local network group 16a may include a switch or hub 19 for implementing a star topology with the devices 18a, 18b and 18c. Accordingly, the star topology may physically connect each of the devices 18a, 18b and 18c point to point with the switch or hub 19. Also, the local network group 16b may implement a linear topology with the devices 18d, 18e and 18f. Accordingly, the linear topology may physically connect the devices 18d, 18e and 18f one after another in a daisy chain. Also, the local network group 16c may implement a ring topology with the devices 18f, 18h, 18i and 18j. Accordingly, the ring topology may physically connect the devices 18f, 18h, 18i and 18j one after another to form a closed loop.

Ring topologies are also described in U.S. Pat. No. 8,244,838, "Industrial Controller Employing the Network Ring Topology," which document is incorporated by reference in its entirety. Accordingly, the local network group 16c may employ a ring topology that is normally opened by a ring supervisor, such as device 18g (also identified in FIG. 1 as device "1"), at the ring supervisor. Upon failure of the ring network, the ring supervisor may reconnect the ring to provide an alternative transmission path around the failure point.

In addition, a computing device or server 26 may be provided in the system 10. In one example, the server 26 may connect to the switch 14a. The server 26 may have a processor executing a program stored in a non-transient medium to allow a user to provide control in the system 10, such as via a keyboard, monitor and/or other I/O as known in the art. In one aspect, the server 26 may implement a Dynamic Host Configuration Protocol (DHCP) program 28, as known in the art, for address assignment in the system 10 as will be further described. In another aspect, the server 26 may implement the Studio 5000 environment available from Rockwell Automation and/or other program modules useful in the system 10, such as for providing start address information, developing an industrial control program, and/or developing a device configuration as will be further described.

Also, a Human Machine Interface (HMI) 30 may be provided in the system 10. In one example, the HMI 30 may connect to the switch 14a. The HMI 30 may have a processor executing a program stored in a non-transient medium to allow a user to provide control in the system 10 similar to the server 26.

For devices in the local network groups 16b (Group 2) implementing a linear topology, and/or devices in the local network groups 16c (Group 3) implementing a ring topology, IP addresses may be assigned in accordance with an aspect of the invention. A first device in each of the groups, such as device 18d in the local network group 16b, and/or device 18g in the local network group 16c, may function as an "initiator" device for the group. The initiator device may be provided with global network information. The initiator device may then execute a position-based sequential IP addressing process for subsequent devices in the group. Accordingly, a Network ID ("network identifier"), a Group ID ("group identifier") and an updateable Group Device ID (GDID, or "group device identifier") may be provided to every device in the group via addressing command messages. Each device may then generate its group device identifier based on its position in the network. With a determined group device identifier, each device may then also determine an IP address according to the network identifier, the group identifier and its group device identifier taken together. The "topology information" (which may include a list of devices with corresponding IP addresses, MAC addresses, device ID's and/or position ID's and/or a total number of devices) and/or "status information" (which may communicate a topology change and/or device fault in the group, if any) may then be returned as an addressing result to each of the devices via an addressing complete message.

Figure 2:
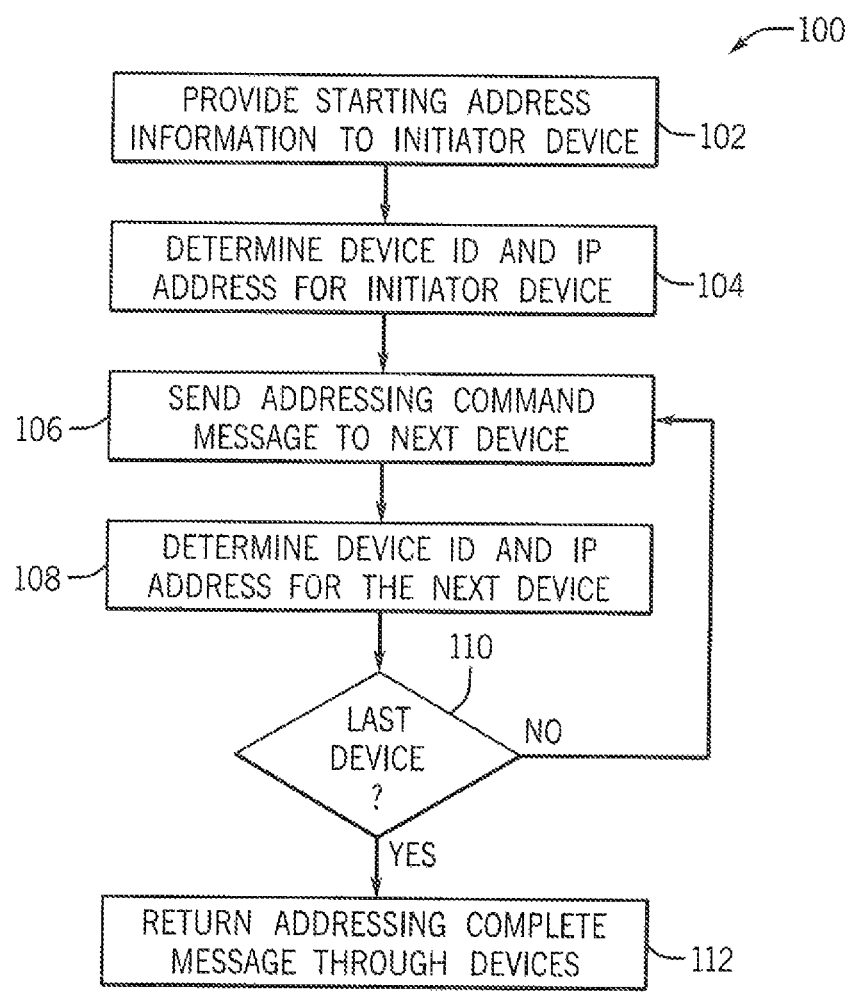
FIG. 2 is a flow chart illustrating an exemplar process for assigning IP addresses in accordance with an embodiment of the invention.

Referring now to FIG. 2, a flow chart illustrating an exemplar process 100 for assigning IP addresses is provided in accordance with an embodiment of the invention. The process 100 will be described by way of example with respect to the local network group 16*b* and the devices 18*d*, 18*e* and 18*f*. However, it will be appreciated that the process 100 or similar processes may be used in a variety of control network configurations having more or less devices 18 and varying network topologies, such as the local network group 16*c* and the devices 18*g*, 18*h*, 18*i* and 18*j*.

Beginning at step 102, starting address information may be provided to an initiator device, such as the first device 18*d*, in the local network group 16*b*. The starting address information may be provided, for example, by the switch 14*a* connected to the local network group 16*b*, the server 26 (which may implement a user tool), the HMI 30, or another upstream element.

With additional reference to FIG. 3, the starting address information may include a network identifier 120, a group identifier 122 and/or an updateable group device identifier 124. The network identifier 120 may include global network information for the system 10, which may originate from the router 12, including for example, an IP subnet address 120*a* or prefix (such as 192.168.1.0), an IP subnet size 120*b* (such as 256), an IP gateway address 120*c* (such as 0.0.0.0) and/or an IP subnet mask 120*d* (such as 255.255.255.00), as known in the art. The group identifier 122 may include group network information which may augment the global network information, including for example, a group identification number 122*a* (such as 0 or 1), which may correspond to the local network group 16*a* for distinguishing from other local network groups connected to the switch in the system 10, and/or a group size 122*b* (which may be equal to the IP subnet size). The group device identifier 124 may further augment the global network information by providing a unique device number based on a relative position for each device 18 in the local network group 16*b*. The group device identifier 124 may be updateable by each device 18 so that a relative position for each device in the local network group 16*b* may be provided. The starting address information may indicate that the initiator device, or first device 18*d*, is positioned first in the local network group 16 and is therefore an initiator device.

Returning again to FIG. 2, at step 104, the first device 18*d* may execute a program stored in a non-transient medium operable to determine its position in the local network group 16, relative to other devices 18 in the local network group 16*b*, by referencing the group device identifier 124 and/or the starting address information. For the first device 18*d* being the initiator device, the group device identifier 124 may be initially set to indicate that the first device 18*d* is positioned first in the local network group 16*b*.

With additional reference to FIG. 4, the first device 18*d* may acquire an IP address by applying an address assignment system 130, shown by way of example, or by communicating with another device applying the address assignment system 130. Accordingly, structure of the address assignment system 130 may be implemented, for example, in the devices 18, the server 26 (such as via the DHCP program 28) and/or the HMI 30, by hardware, software, or combination thereof. In the address assignment system 130, at least a portion of the network identifier 120, such as the IP subnet address 120*a*, at least a portion of the group identifier 122, such as the group identification number 122*a*, and the group device identifier 124 may be applied to an applicator 132. With the first device 18*d* also being the initiator device, the first device 18*d* may follow a direct path 134 to the applicator 132. The applicator 132, in turn, may apply the at least a portion of the network identifier 120, the at least a portion of the group identifier 122 and the group device identifier 124 to produce an IP address 136 for the first device 18*d*. In one aspect, the applicator 132 may implement summation logic.

Returning again to FIG. 2, at step 106, the first device 18*d* may further execute to send an addressing command message to the second device 18*e* in the local network group 16. The addressing command message may include the at least a portion of the network identifier 120, the at least a portion of the group identifier 122, and/or the group device identifier 124. The addressing command message may be communicated as an Open Systems Interconnection (OSI) model data link layer message as known in the art.

At step 108, the second device 18*e* may execute a program stored in a non-transient medium operable to determine its position in the local network group 16*b*, relative to other devices 18 in the local network group 16*b*, and adjust the group device identifier 124. In one aspect, with reference again to FIG. 4, the second device 18*e* may determine its position and apply an adjustor 138 to adjust the group device identifier 124 to produce an updated group device identifier 124'. The adjustor 138 may increment the group device identifier 124. Accordingly, the group device identifier 124 may follow an indirect path 140, through the adjustor 138, to the applicator 132. The applicator 132, in turn, may similarly apply the at least a portion of the network identifier 120, the at least a portion of the group identifier 122 and/or the updated group device identifier 124' to produce an IP address 136 for the second device 18*e*. In another aspect, the group device identifier 124 could be adjusted by the first device 18*d* before being sent to the second device 18*e*.

Returning again to FIG. 2, at decision block 110, in the process 100, it is determined whether the second device 18*e* is the last device in the local network group 16*b*. If the second device 18*e* is not the last device in the local network group ("NO" in FIG. 2), the second device 18*e* may further execute to send the addressing command message to a third device 18*f*, and the process may return to step 106. The third device 18*f*, in turn, may similarly execute to determine its position, acquire an IP address, and so forth.

However, if the second device 18*e* is the last device ("YES" in FIG. 2), the process may continue instead to step 112 in which an addressing complete message may be sent through each of the devices 18 in the local network group 16*b*. With additional reference to FIG. 5, the addressing complete message may include a data collection for each device 18 in the local network group 16, corresponding to the position of the device 18, including for example, the IP address 136, a Media Access Control (MAC) address/ID and/or status field 144, the updated group device identifier 124' and/or a Common Industrial Protocol (CIP) identity object 146. The CIP identity object 146 may provide an attribute for distinguishing a device 18 from among multiple devices 18, such as one or more of a Vendor ID, Device Type, Product Code and/or Serial Number, as described in "The Common Industrial Protocol (CIP) and the Family of CIP Networks." Copyright 2006, Open DeviceNet Vendor Association, Inc., which document is incorporated herein by reference in its entirety. Like the addressing command message, the addressing complete message may also be communicated as an OSI model data link layer message as known in the art.

Figure 6A:
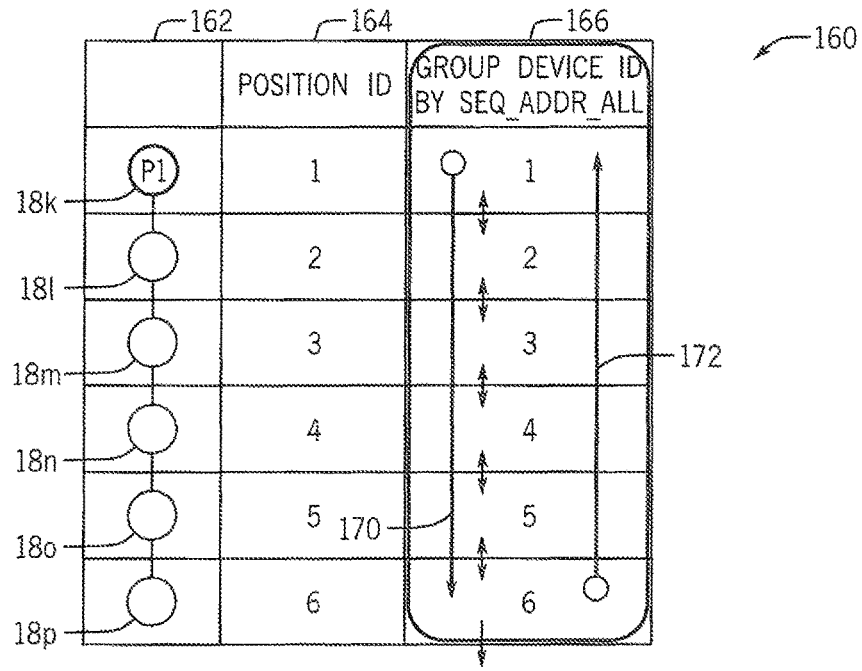
FIG. 6A is an exemplar table illustrating assignment of IP addresses for devices of a local network group in accordance with an embodiment of the invention.

Referring now to FIG. 6A, an exemplar table 160 illustrating assignment of IP addresses for devices in a local network group is provided in accordance with an embodiment of the invention. A first column 162 may indicate devices 18 (shown by way of example as circles and identified as devices 18k through 18p in FIG. 6A) in a local network group 16, such as in the system 10. The devices 18 may be in a linear or ring topology as illustrated by connections between the devices 18 in the table 160. The first device in the first column 162 (the device 18k also identified as "P1" in FIG. 6A) may serve as an initiator device in the local network group. The first device could be, for example, an industrial controller, and in particular, a PLC, and if configured in a ring topology, could also be a ring supervisor. The remaining devices in the first column 162 could be, for example, industrial control devices, such as drives, I/O modules, constrained devices, and the like, which may be in communication with an industrial process or machine via sensors and/or actuators. A second column 164 may indicate an actual, relative position (or "Position ID") for each device 18 in the local network group. A third column 166 may indicate execution of an addressing process to produce group device identifiers (and in turn, IP addresses) in accordance with an embodiment of the invention. For example, an addressing command message 170 may be propagated through the devices 18, the devices 18 may receive unique group identifiers, such as "1," "2," "3," "4," "5" and "6," and an addressing complete message 172 may be returned through the devices 18. For most applications, the group device identifier produced in the third column 166 may be equal to the Position ID in the second column 164.

Figure 6B:
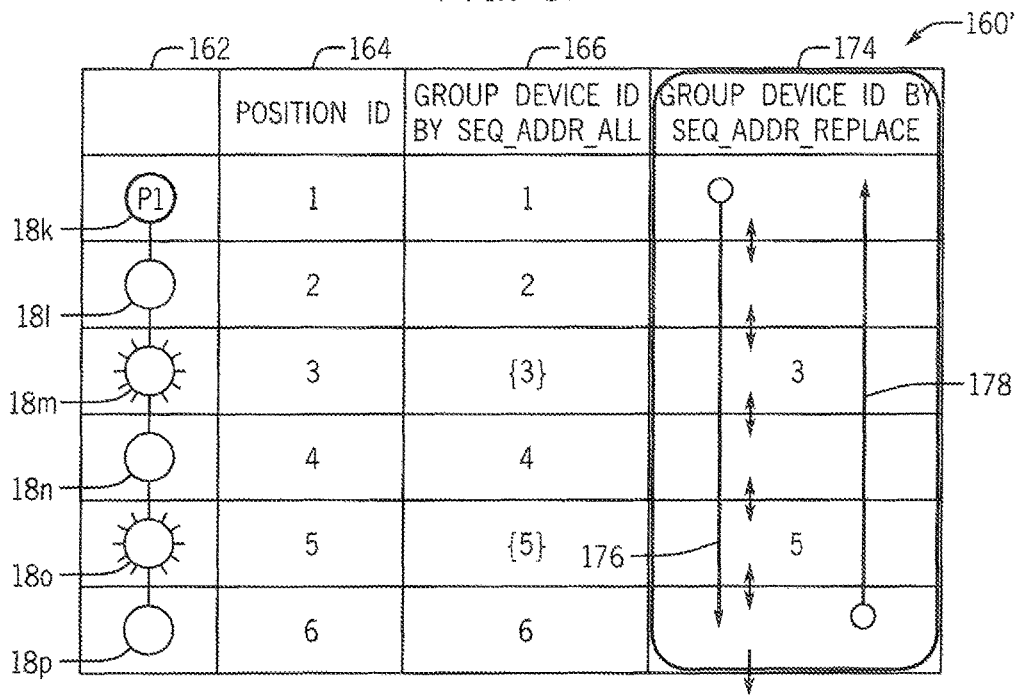
FIG. 6B is table illustrating an updated assignment of IP addresses for the devices of FIG. 6A in which devices have been updated.

With additional reference to FIG. 6B, at a later time, certain devices 18 may be upgraded or replaced as indicated in the first updated table 160'. This may include, for example, maintaining the same hardware while upgraded software and/or firmware, or replacing hardware with substantially similar hardware. For example, the third column 166 may indicate that the third device 18m and the fifth device 18o have been changed (upgraded or replaced) and, as a result, the group device identifiers may be outdated.

Accordingly, a fourth column 174 may indicate execution of a subsequent addressing process to produce updated group device identifiers (and in turn, IP addresses) in accordance with an embodiment of the invention. For example, a subsequent addressing command message 176 may be propagated through the devices 18. Devices 18 which already have a group device identifier may retain their current group device identifier. However, the changed devices may each receive the same group device identifier previously assigned. Accordingly, the third device 18m may again receive the group device identifier "3," and the fifth device 18o may again receive the group device identifier "5." Finally, a subsequent addressing complete message 178 may be returned through the devices 18.

Figure 6C:
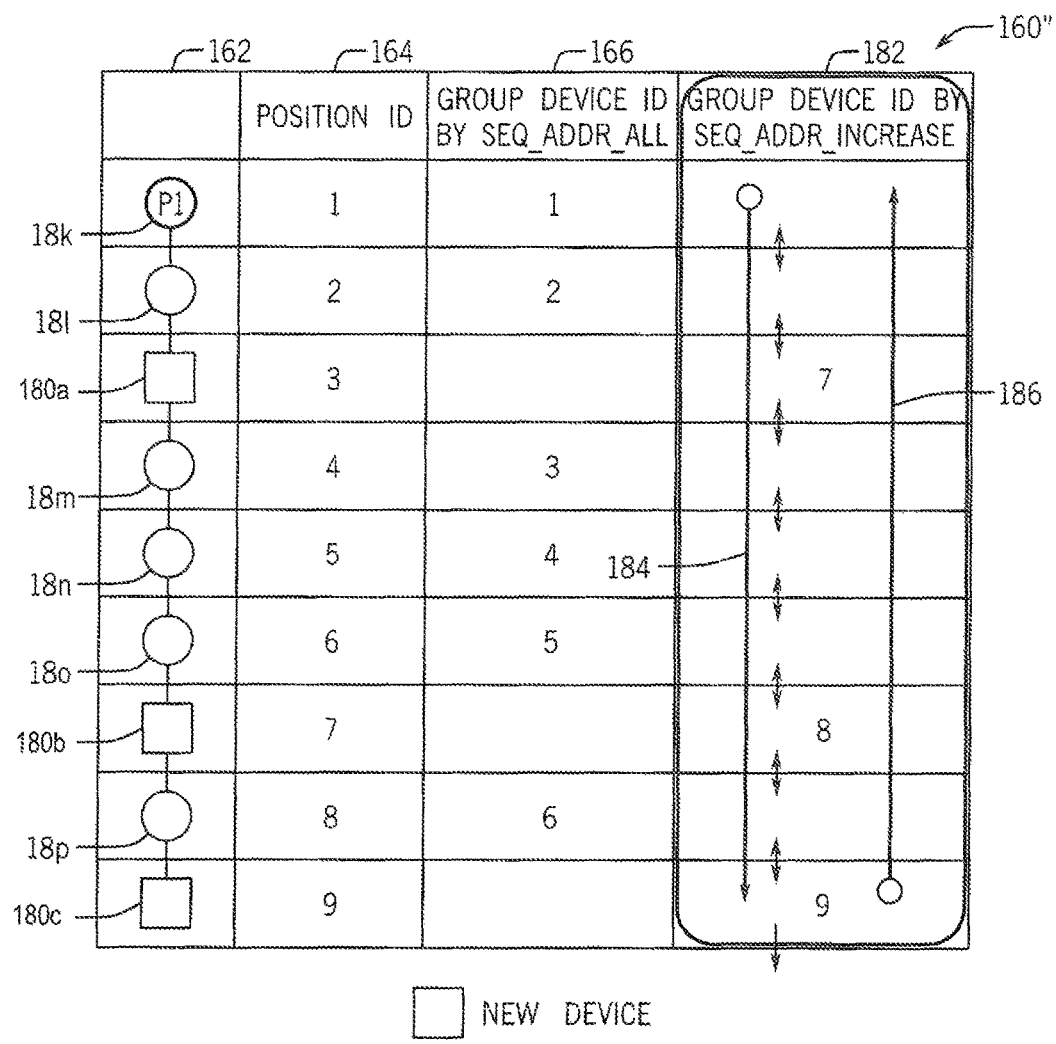
FIG. 6C is table illustrating an updated assignment of IP addresses for the devices of FIG. 6A in which new devices have been added.

With additional reference to FIG. 6C, at a later time, new devices 180 (shown by way of example as squares and identified as first, second and third new devices 180a, 180b and 180c, respectively, in FIG. 6C) may be added to the local network group 16 as indicated in the second updated table 160". For example, a first new device 180a may be installed between the second and third devices 18l and 18m, respectively, a second new device 180b may be installed between the fifth and sixth devices 18o and 18p, respectively, and a third new device 180c may be installed after the sixth device 18p. Accordingly, the Position ID's in the second column 164 have changed, and the group device identifiers in the third column 166 are outdated.

Accordingly, a fourth column 182 may indicate execution of a subsequent addressing process to produce updated group device identifiers (and in turn, IP addresses) in accordance with an embodiment of the invention. For example, a subsequent addressing command message 184 may be propagated through the devices 18 and the new devices 180. Devices 18 which already have a group device identifier may retain their current group device identifier. However, the new devices 180 may each receive an adjusted group device identifier, which may be adjusted based on the last group device identifier to be assigned. Accordingly, the first new device encountered in the sequence, which is the first new device 180a, may receive a unique group identifier such as "7," the second new device encountered in the sequence, which is the second new device 180b, may receive a unique group identifier such as "8." and the third new device encountered in the sequence, which is the third new device 180c, may receive a unique group identifier such as "9." Finally, a subsequent addressing complete message 186 may be returned through the devices 18 and the devices 180. It will be appreciated that a combination of upgrading, replacing, adding and/or subtracting of devices may be provided, with device identifiers (and in turn, IP addresses) being updated, within the scope of the invention.

Figure 7:
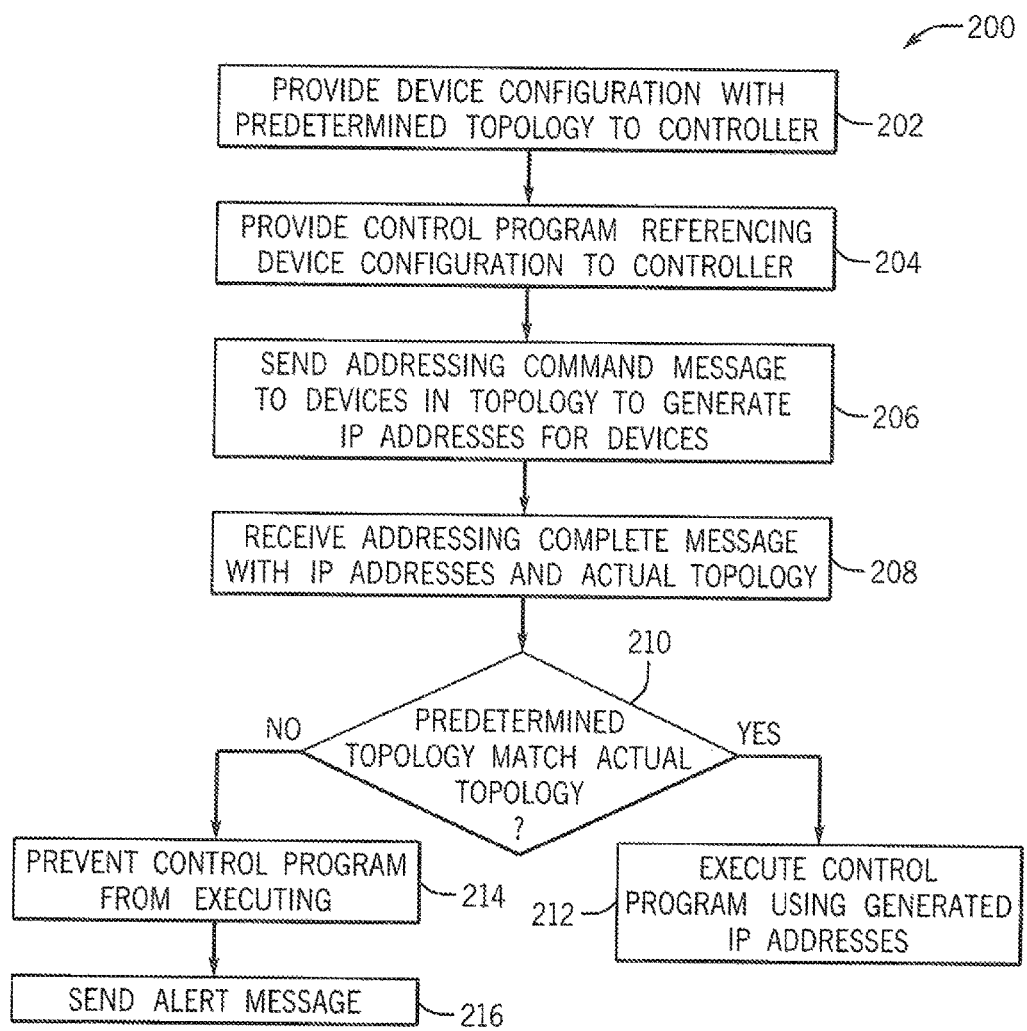
FIG. 7 is a flow chart illustrating an exemplar process for addressing devices in a local network group in accordance with another aspect of the invention.

Referring now to FIG. 7, a flow chart illustrating an exemplar process 200 for addressing devices in a local network group including an industrial controller which may be a PLC is provided in another aspect of the invention. In this aspect, a position for each device 18 (relative to other devices 18) in a topology, and a corresponding device ID for each device 18, may be predetermined. Then, the predetermined position and corresponding device ID for each device may be compared to actual devices 18 in a topology having preprogrammed device ID's and pre-assigned IP addresses. If the comparison produces a match, the pre-assigned IP addresses in the actual devices may be utilized. However, if the comparison does not produce a match, the condition may be reported for further action.

Beginning at step 202, a device configuration may be developed offline, such as by a user operating the server 26 and/or the HMI 30, either of which may be executing the Studio 5000 environment, for providing a predetermined topology. Accordingly, the device configuration may predetermine relative positions for devices in a local network group, such as devices 18 in a local network group 16 of FIG. 1, and may predetermine device identifiers corresponding to the predetermined relative positions, respectively. The predetermined device identifiers may provide attributes for distinguishing each of the devices from other devices.

With additional reference to FIG. 8, an exemplar device configuration 230 is provided with parameters in tabular form. A first column 232 of the device configuration 230 may identify devices 18 in a linear or ring topology according to predetermined relative positions in a local network group. For example, "1" may refer to an initiator device or first device 18, while "n" may refer to a last device positioned in the topology. A second column 234 of the device configuration 230 may identify predetermined device identifiers (identified in FIG. 8 as "Product Key 1," "Product Key 2," and so forth) corresponding to the predetermined relative positions, respectively. The predetermined device identifiers may provide attributes for distinguishing devices from one another. For example, a device identifier could be CIP identity object, such as a Vendor ID, Device Type, Product Code or Serial Number. However, other device identifiers capable of distinguishing industrial control devices from one another may be used within the scope of the invention. A third column 236 may indicate a current IP addressing mode for each device, which in the development environment may simply be waiting for an automatic IP address assignment configuration such as the method described above with respect to FIG. 2. A fourth column 238 may indicate current IP addresses for each device, which in the development environment may simply be unassigned or default IP addresses. A fifth column 240 may indicate a name, function and/or any other useful parameter for each device.

Returning again to FIG. 7, after the device configuration is developed, it may be provided to an industrial controller in a local network group that is believed to implement the predetermined topology, such as the device 18d of FIG. 1 or the device 18k of FIG. 6A. The local network group could be, for example, one of many replications of a working cell.

Next, at step 204, an industrial control program may be developed offline, such as by a user operating the server 26 and/or the HMI 30, either of which may be executing the Studio 5000 environment, for controlling an industrial process or machine, such as the industrial process or machine 20. The control program may be configured to control devices in the local network group. In addition, the control program may also be being configured to reference the devices in the local network group using the device configuration, such as by referencing the predetermined relative positions in the first column 232 and/or the predetermined device identifiers in the second column 234. After the control program is developed, it may also be provided to the industrial controller in the local network group believed to implement the predetermined topology.

Next, at step 206, an addressing command message, as described above with respect to FIG. 2, may be sent to the devices in the local network group. Accordingly, the addressing command message may be configured to generate IP addresses for the devices in the local network group and produce an addressing complete message.

Next, at step 208, an addressing complete message may be received. The addressing complete message may provide, among other things, actual relative positions for the devices in the local network group, actual device identifiers corresponding to the actual relative positions, respectively; and IP addresses for the devices in the local network group.

With additional reference to FIG. 9, the addressing complete message may provide an exemplar device collection 250 with parameters as illustrated in tabular form. A first column 252 of the device configuration 230 may identify devices 18 in a linear or ring topology according to actual relative positions for the devices in the local network group. For example, "1" may refer to an initiator device or first device 18, while "n" may refer to a last device positioned in the topology, as found in the system. A second column 254 may indicate currently assigned IP addresses for the devices, such as according to the method described above with respect to FIG. 2. A third column 256 of the device configuration 230 may identify actual device identifiers (identified in FIG. 9 as "Product Key 1," "Product Key 2," and so forth) corresponding to the actual relative positions, respectively, as found in the system. A fourth column 258 may indicate Media Access Control (MAC) addresses/IDs and/or status fields for the devices and/or any other useful parameters as found in the system.

Returning again to FIG. 7, after receiving actual system information from the addressing complete message, the process may continue to decision block 210 in which the predetermined topology, such as according to the device configuration 230, is compared to the actual topology, such as according to the device collection 250. In particular, the predetermined relative positions and the predetermined device identifiers from the predetermined topology may be compared to the actual relative positions and the actual device identifiers from the actual topology, respectively, to determine a match. For example, the predetermined relative positions in the first column 232 and the predetermined device identifiers in the second column 234, each with respect to the device configuration 230 of FIG. 8, may be determined to match in order and content the actual relative positions in the first column 252 and the actual device identifiers in the third column 256, each with respect to the device collection 250 of FIG. 9.

Upon successfully determining a match ("YES" in FIG. 7), the process 200 may continue to step 212 in which the industrial controller may accept the currently assigned IP addresses for the devices and begin executing the control program to control the devices in the local network group by using the currently assigned IP addresses corresponding to the devices. However, upon failing to determine a match ("NO" in FIG. 7), the process 200 may continue instead to step 214 in which the control program is prevented from executing and step 216 in which an alert message is sent to the user, such as via the server 26 and/or the HMI 30.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processors can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and/or can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A method for assigning Internet Protocol (IP) addresses to industrial control devices in a local network group connected to a switch, the local network group being part of an industrial control network connected to a router, the method comprising:
providing starting address information to a first device in the local network group, the first device being an industrial control device for controlling an industrial process or machine, the starting address information including:
(i) an IP subnet address for the router; and
(ii) a group device identifier for distinguishing the first device from other devices in the local network group, the group device identifier initially indicating that the first device is positioned first in the local network group;
sending an addressing command message from the first device to a second device in the local network group, the second device being an industrial control device for controlling an industrial process or machine, the addressing command message including the IP subnet address and the group device identifier for the first device;
determining a position for the second device in the local network group and updating the group device identifier in the addressing command message to produce an updated group device identifier for the second device according to the position; and
determining an IP address for the second device by applying the IP subnet address and the updated group device identifier to produce the IP address,
wherein the devices are physically connected one after another in a daisy chain, and wherein the position determined for updating the group device identifier corresponds to a relative position of the device as physically connected in the daisy chain,
wherein at least one of the devices is an industrial controller configured to execute a control program for controlling a process or machine and at least one of the devices is an actuator for controlling the process or machine, and
wherein the industrial controller holds the control program idle pending resolution of the IP addresses.

2. The method of claim 1, wherein the starting address information further includes a group identifier from the switch for distinguishing local network groups connected to the switch in the industrial control network, the addressing command message further includes the group identifier, and the step of determining the IP address further comprises applying the group identifier to produce the IP address.

3. The method of claim 1, further comprising determining an IP address for the first device by applying the IP subnet address and the group device identifier indicating that the first device is positioned first in the local network group to produce the IP address for the first device.

4. The method of claim 1, further comprising a third device, wherein the first, second and third devices are connected in a linear topology, and wherein the devices further comprise a sensor sensing a condition of the process or machine.

5. The method of claim 1, further comprising a third device, wherein the first, second and third devices are connected in a ring topology, and wherein the devices further comprise a sensor sensing a condition of the process or machine.

6. The method of claim 5, wherein the first device is a ring supervisor operating to provide a transmission path around a failure point in the ring topology.

7. The method of claim 1, further comprising providing the starting address information to the first device from at least one of the switch and a separate server implementing Dynamic Host Configuration Protocol (DHCP).

8. The method of claim 1, further comprising providing the starting address information to the first device from a Human Machine Interface (HMI) operated by a user.

9. The method of claim 1, further comprising sending an addressing complete message from second device to the first device, the addressing complete message including the IP address and a Media Access Control (MAC) address for the second device.

10. The method of claim 9, wherein the addressing command message and the addressing complete message are Open Systems Interconnection (OSI) model data link layer messages.

11. The method of claim 1, wherein the IP address is implemented according to at least one of: Internet Protocol version 4 ("IPv4"), and Internet Protocol version 6 ("IPv6").

12. An industrial control system comprising:
a router;
a switch connected to the router; and
first and second devices connected in a local network group, the first and second devices being industrial control devices for controlling an industrial process or machine, the local network group being connected to the switch, wherein the first device is operable to receive starting address information including:
(i) an IP subnet address for the router; and
(ii) a group device identifier for distinguishing the first device from other devices in the local network group, the group device identifier initially indicating that the first device is positioned first in the local network group,
wherein the first device is further operable to execute a program stored in a non-transient medium operable to send an addressing command message to the second device in the local network group, the addressing command message including the IP subnet address and the group device identifier for the first device, and
wherein the second device is operable to execute a program stored in a non-transient medium operable to:
(a) determine a position for the second device in the local network group and update the group device identifier in the addressing command message to produce an updated group device identifier for the second device according to the position; and
(b) determine an IP address for the second device by applying the IP subnet address and the updated group device identifier to produce the IP address,
wherein the devices are physically connected one after another in a daisy chain, and wherein the position determined for updating the group device identifier corresponds to a relative position of the device as physically connected in the daisy chain,
wherein at least one of the devices is an industrial controller configured to execute a control program for controlling a process or machine and at least one of the devices is an actuator for controlling the process or machine, and wherein the industrial controller holds the control program idle pending resolution of the IP addresses.

13. The industrial control system of claim 12, wherein the starting address information further includes a group identifier from the switch for distinguishing local network groups connected to the switch in the industrial control network, the addressing command message further includes the group identifier, and the step of determining, the IP address further comprises applying the group identifier to produce the IP address.

14. The industrial control system of claim 12, farther comprising a third device, wherein the first, second and third devices are connected in a linear topology, and wherein the devices further comprise a sensor sensing a condition of the process or machine.

15. The industrial control system of claim 12, further comprising a third device, wherein the first, second and third devices are connected in a ring, topology, and the first device is a ring supervisor in the ring topology, and wherein the devices further comprise a sensor sensing a condition of the process or machine.

16. The industrial control system of claim 12, further comprising a server implementing Dynamic Host Configuration Protocol (DHCP), the server being in communication with the switch, wherein the starting address information is provided to the first device from the server.

17. The industrial control system of claim 12, further comprising a Human Machine Interface (HMI) operable by a user, the HMI being in communication with the switch, wherein the starting address information is provided to the first device from the HMI.

18. The industrial control system of claim 12, wherein the second device is further operable to send an addressing complete message to the first device, the addressing complete message including the IP address and a Media Access Control (MAC) address for the second device.

19. An industrial control system comprising:
a router;
a switch connected to the router; and
first and second devices connected in a local network group, the first and second devices being industrial control devices for controlling an industrial process or machine, the local network group being connected to the switch, wherein the first device is operable to receive starting address information including:
(i) an IP subnet address for the router; and
(ii) a group device identifier for distinguishing the first device from other devices in the local network group, the group device identifier initially indicating that the first device is positioned first in the local network group,
wherein the first device is further operable to execute a program stored in a non-transient medium operable to send an addressing command message to the second device in the local network group, the addressing command message including the IP subnet address and the group device identifier for the first device, and
wherein the second device is operable to execute a program stored in a non-transient medium operable to:
(a) determine a position for the second device in the local network group and update the group device identifier in the addressing command message to produce an updated group device identifier for the second device according to the position;
(b) send the updated group device identifier to an address assigning device for applying the IP subnet address and the updated group device identifier to produce an IP address; and
(c) receive the IP address from the address assigning device,
wherein the devices are physically connected one after another in a daisy chain, and wherein the position determined for updating the group device identifier corresponds to a relative position of the device as physically connected in the daisy chain,
wherein at least one of the devices is an industrial controller configured to execute a control program for controlling a process or machine and at least one of the devices is an actuator for controlling the process or machine, and
wherein the industrial controller holds the control program idle pending resolution of the IP addresses.

20. The industrial control system of claim 19, wherein the switch is operable to implement DHCP, and wherein the switch is the address assigning device.

* * * * *